Apr. 17, 1923.
W. N. McCONNEL
1,452,122
RECORDER
Filed April 12, 1921
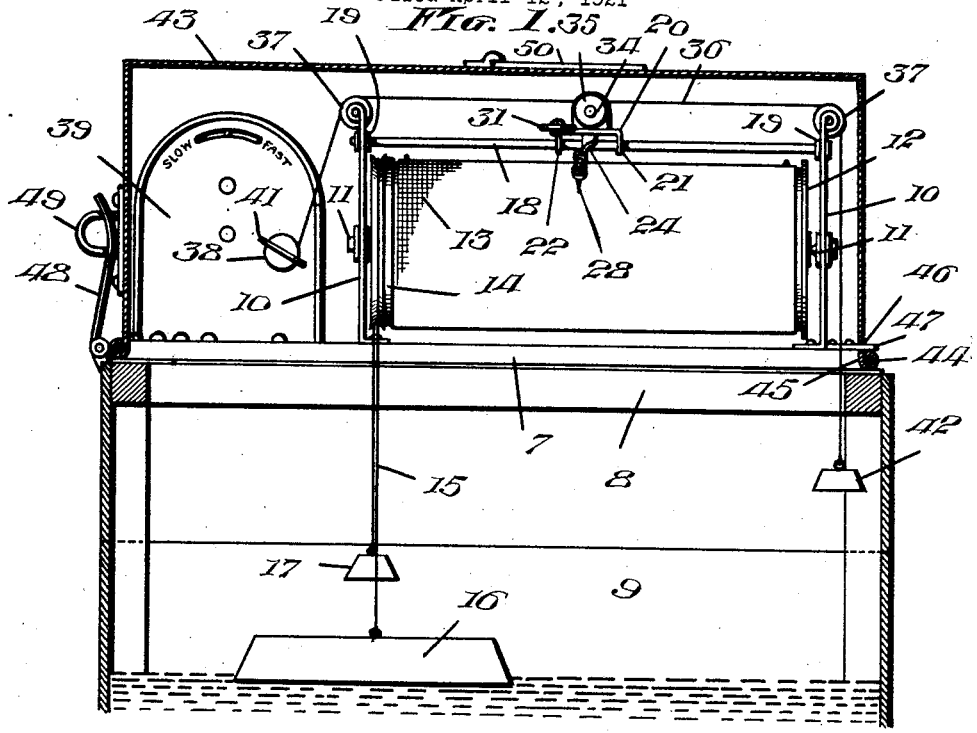
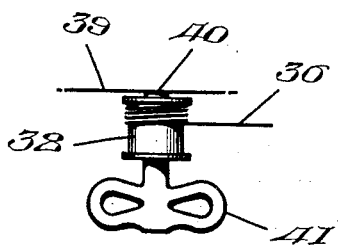
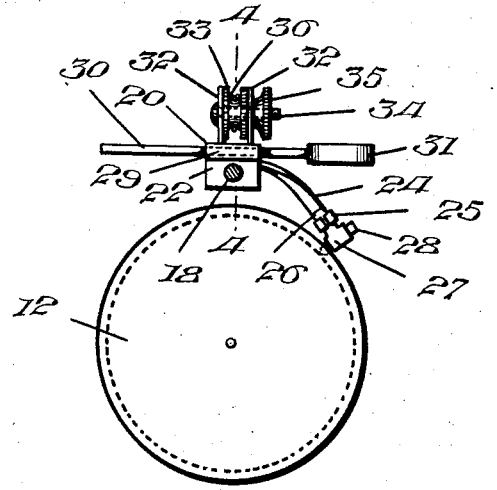
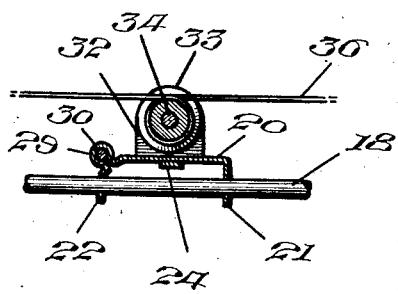
Inventor
WILLIAM N McCONNEL
By W. J. Fitz Gerald & Co.
Attorney Patented Apr. 17, 1923.

1,452,122

UNITED STATES PATENT OFFICE.

WILLIAM N. McCONNEL, OF MILNER, IDAHO.

RECORDER.

Application filed April 12, 1921. Serial No. 460,722.

*To all whom it may concern:*

Be it known that I, WILLIAM N. McCON-NEL, a citizen of the United States, residing at Milner, in the county of Twin Falls and State of Idaho, have invented certain new and useful Improvements in Recorders; and I do hereby declare the following to be a full, clear, and exact description of the invention, such as will enable others skilled in the art to which it appertains to make and use the same.

The present invention relates to recording devices, and aims to provide novel and improved means for mounting or carrying the marking element for cooperation with a drum containing a chart.

Another object is the provision of a carrier for the marking element movable longitudinally of the drum and swingable transversely to bring the marking element against the chart, and means being provided for regulating the pressure of said element against the chart.

A further object is the provision of such a carrier having novel means whereby it can be adjusted along the wire or flexible element which is used for moving said carrier longitudinally, whereby the marking element can be conveniently set according to the time or position desired.

The invention also has for an object to improve the recorder generally in its construction and details, to enhance the utility and efficiency thereof.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a side elevation of the recorder, portions being shown in section.

Fig. 2 is an end view of the drum and carrier.

Fig. 3 is a plan view showing the spool of the clock mechanism for actuating the carrier.

Fig. 4 is a section on the line 4—4 of Fig. 2.

The recording device is mounted on a suitable base 7 supported on a frame 8 over the well 9 (the recorder being shown as for the purpose of obtaining the water stage record, although it can be used for other purposes for which it is suited), and a pair of posts 10 are mounted on and rise from the base 7 and have pivots 11 for the ends of the recorder drum 12 on which a chart 13 is disposed, and which can be lined longitudinally and transversely into suitable units, according to the record desired, such as to show the changes in water level for different periods of the day, or the like. The drum 12 is provided at one end with a sheave 14, around which a wire, cord or other flexible element 15 passes, for the purpose of rotating the drum. As shown, a float 16 is attached to one end of the wire 15 to rise and fall with the water level, and a weight 17 is suspended from the other end of said wire, to keep said wire taut, and to provide for the rotation of the drum 12 in opposite directions when the float 16 moves upwardly and downwardly. In this manner, the drum is turned proportionately with the rise and fall of the water level, when the device is used as a water stage recorder.

In order to conveniently support the marking element carrier for longitudinal movement along the drum parallel with the axis thereof, a rod 18 has its terminals secured to the posts 10 by means of nuts 19, or the like, and said rod is disposed above the drum. The carrier 20, as shown, is struck from sheet metal and has the end portions 21 and 22 bent downwardly and apertured to fit slidably and rotatably on the rod 18. A spring arm 24 is soldered or otherwise fastened to the carrier 20, preferably to the under side thereof, and projects to one side from the rod 18. The arm 24 is curved downwardly, and at its free end has opposite ears 25 bent back and forming a socket for receiving the stem 26 of a sleeve 27 in which the marking element 28 is fitted, thus providing for the convenient attachment of said marking element to and detachment thereof from said drum. The marking element can either be a pencil or pen, whichever is preferred, and the point thereof is adapted to bear against the chart 13 by the swinging movement of the carrier 20 on the rod 18.

As a means for holding the marking element 28 against the chart 13 with the desired pressure, the carrier 20 is formed with transverse split sleeve 29 through which the rod 30 is slidable frictionally at right angles with the rod 18 or transversely across said rod 18. The sleeve 29, as shown, is formed by bending the sheet metal at the corner of the portion 22, as seen in Fig. 4, whereby to frictionally grip the rod 30. On one end of the rod 30 there is secured a weight 31, which is located at the same side of the carrier as the marking element 28, whereby the tendency for the weight 31 is to swing the carrier 20 in a direction to move the arm 24 downwardly, thereby holding the marking element 28 against the drum. By adjusting the weight 31 closer to or farther away from the carrier or slide 30, the pressure against the marking element is either decreased or increased, accordingly, whereby the pressure on such marking element can be regulated conveniently, and without the use of springs. In order that the carrier 20 can be slid longitudinally along the rod 18, said carrier is formed with a pair of upstanding ears 32 disposed in longitudinal position, and having a grooved sheave 33 disposed between them and mounted for rotation on the axle pin 34 extending from one ear 32 through the sheave 33 and the other ear 32. A knurled nut 35 is screw-threaded on the projecting terminal of the pin 34 for springing the ears 32 against one another to clamp the sheave 33 between them, and thus prevent the sheave from rotating, unless the nut 35 is unscrewed to loosen the resilient ears 32 from said sheave.

An actuating wire or other flexible element 36 extends longitudinally above and parallel with the rod 18, and is coiled or wrapped around the sheave 33 in the groove thereof, and said wire 36 passes over pulleys 37 mounted for rotation on the upper ends of the posts 10 above the rod 18. One terminal of the wire 36 is wound on a spool 38 which is rotated by a clock mechanism 39, whereby to pull said wire to the corresponding end of the drum, for advancing the carrier 20 gradually according to a desired time unit. As shown, the spool 38 is mounted on an arbor 40 of the clock mechanism, and has a finger piece 41 for convenience in winding up said mechanism and winding the wire 36 on the spool. As the clock mechanism operates it will permit the wire to unwind from the spool 38 and permit the carrier 20 to advance the marking element by the influence of a weight 42 attached to the opposite free end of the wire 36.

In order to protect and enclose the recording mechanism, a hood 43 is disposed over same, and has a marginal bead 44 to fit the margin of the base 7, which is rabbeted, as at 45. The hood 43 has a slot 46 at one end to receive a tongue 47 projecting from the corresponding end of the base 7, when said end of the hood is moved into position with a longitudinal movement, whereby to hold said end of the hood down in place unless the opposite end thereof is raised to permit of the longitudinal movement of the hood toward the right, as seen in Fig. 1. A hasp 48 is hinged to the opposite end of the base 7 or frame 8, and is swingable upwardly into engagement with the keeper 49 carried by the corresponding end of the hood 43, for the engagement of the padlock (not shown), whereby the hood can be locked down on the base, to prevent tampering with the mechanism without the possession of a proper key. The hood 43 can have a suitable handle 50 on the top thereof for lifting the hood when the hasp 48 is disengaged from the keeper 49, and corresponding end of the hood raised and the hood moved toward the right out of engagement with the tongue 47.

In operation, the clock mechanism 39 in rotating the spool 38, will unwind the wire 36, thereby slowly advancing the carrier 20 to the right, and the marking element 28 will mark a line on the chart 13 from one end to the other, and such line will indicate the rise and fall of the water level, and also the hour and day of such rise and fall, owing to the turning movement of the drum 12 when the float 15 moves upwardly and downwardly with the water level. To start mechanism, the finger piece 41 is rotated to wind up the clock mechanism 39 and wind the wire 36 on the spool, thereby pulling the carrier 20 to the left to starting position. By loosening the nut 37, this will release the sheave 33, which can then be turned by hand for advancing the carrier 20 or setting the same backwardly, to properly position the marking element 28. The periphery of the sheave 33 is preferably knurled for conveniently turning said sheave, and when the marking element is properly positioned, the nut 35 is tightened to clamp the sheave 33 in position. It will also be noted that the pressure of the marking element on the drum 12 can be regulated by adjusting the weight rod 40 through the carrier 20, thus providing a desirable and convenient arrangement without the use of a spring or similar device.

When using the recorder for other purposes, the drum 12 can be rotated by any other suitable means, and the wire 36 also moved by any other suitable contrivance.

Having thus described the invention, what is claimed as new is:—

1. In a recording device, a rod, a carrier bent from sheet metal having end portions extending at an angle and fitted on said rod for sliding and turning movements, said carrier having a bent portion forming a split sleeve, an arm extending from the carrier to one side of the rod for supporting a marking element to bear on a chart, means for moving said carrier along said rod, and a rod frictionally gripped in said sleeve for transverse adjustment relatively to the aforesaid rod and having a weight to press the arm toward said chart.

2. In a recording device, a rod, a carrier mounted on said rod for longitudinal and turning movement and having a transverse gripping sleeve, an arm extending from the carrier to one side of said rod for supporting a marking element to bear on the chart, means for moving said carrier longitudinally on said rod, and a rod slidable transversely of the carrier within said sleeve and having a weight to press said arm toward said chart.

3. In a recording device, a carrier slidable longitudinally, a marking element supported from said carrier, a sheave mounted on said carrier, means for moving said carrier longitudinally including a flexible element wrapped around said sheave, and means for clamping said sheave with respect to the carrier.

4. In a recording device, a longitudinally slidable carrier having a pair of ears, a marking element supported from said carrier, a sheave between said ears means, for clamping said sheave between said ears, and means for sliding said carrier longitudinally including a flexible element wrapped around said sheave.

In testimony whereof I have signed my name to this specification in the presence of two subscribing witnesses.

WILLIAM N. McCONNEL.

Witnesses:
F. W. BECKWITH,
W. O. TAYLOR.